United States Patent [19]

Miguel

[11] Patent Number: 4,534,691
[45] Date of Patent: Aug. 13, 1985

[54] SELF-PROPELLED AGRICULTURAL VEHICLE FOR PICKING UP AND TRANSPORTING LARGE BALES OF HAY

[75] Inventor: Marvin E. Miguel, Armona, Calif.

[73] Assignee: J. A. Freeman & Son, Inc., Portland, Oreg.

[21] Appl. No.: 542,594

[22] Filed: Oct. 17, 1983

[51] Int. Cl.³ .............................................. A01D 87/12
[52] U.S. Cl. ...................................... 414/38; 414/44; 414/111
[58] Field of Search ................. 414/38, 39, 44, 111

[56] References Cited

U.S. PATENT DOCUMENTS

| | | | |
|---|---|---|---|
| 2,848,127 | 8/1958 | Grey | 414/39 |
| 3,406,840 | 10/1968 | Soteropulos | 414/44 X |
| 3,455,466 | 7/1969 | Barrett et al. | 414/44 X |
| 3,487,955 | 1/1970 | Brown | 414/44 X |
| 3,622,016 | 11/1971 | Welker | 414/39 |
| 3,902,608 | 9/1975 | Butler et al. | 414/44 X |
| 4,008,818 | 2/1977 | Neely | 414/39 X |

FOREIGN PATENT DOCUMENTS

| | | | |
|---|---|---|---|
| 2242021 | 3/1975 | France | 414/38 |
| 2460098 | 2/1981 | France | 414/44 |

Primary Examiner—Leslie J. Paperner
Attorney, Agent, or Firm—Kolisch, Hartwell & Dickinson

[57] ABSTRACT

An agricultural vehicle for picking up and transporting bales of hay. The vehicle is designed to accommodate large bales of hay. The bales are picked up from a field and transported to a pivotably mounted storage box, where the bales are rotated and stored on their ends. The bales are ordered as they are loaded into the storage box. When the storage box has reached capacity, the vehicle is driven to a stacking site where the storage box is pivoted substantially 90°, allowing the bales to be pushed off of the rear surface of the box. The bales may thus be arranged in weather-tight stacks, having been rotated through 180° from their original pick up, grounded position.

4 Claims, 6 Drawing Figures

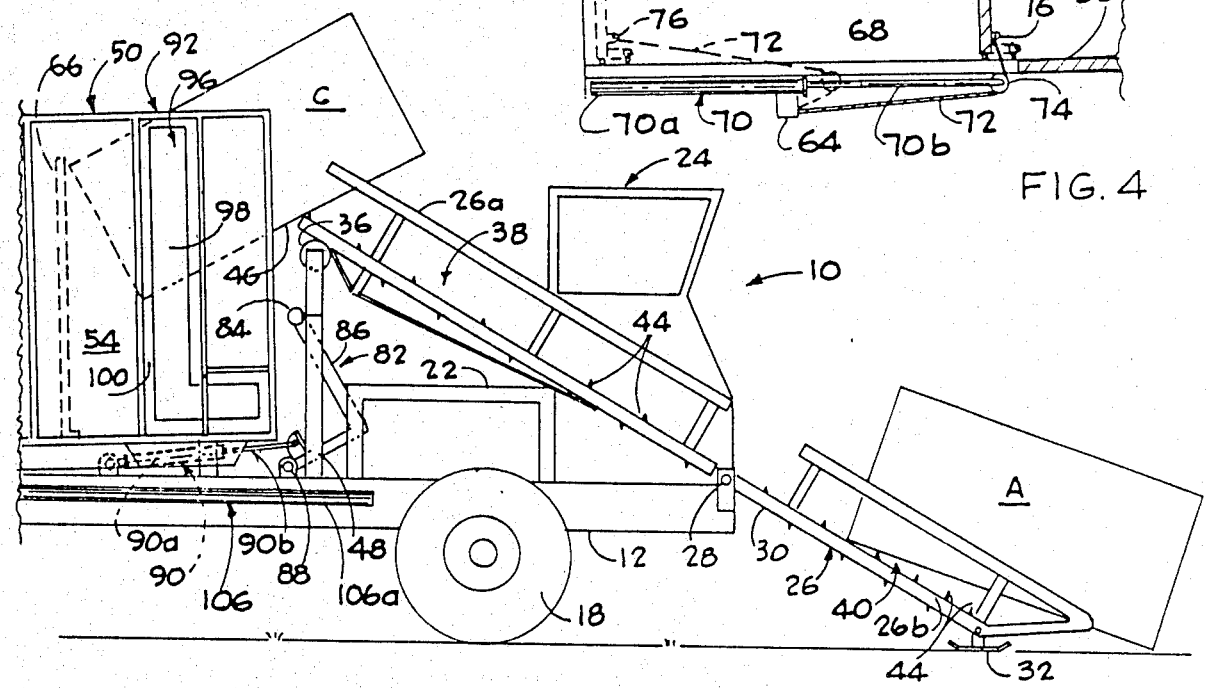
FIG. 4
FIG. 5
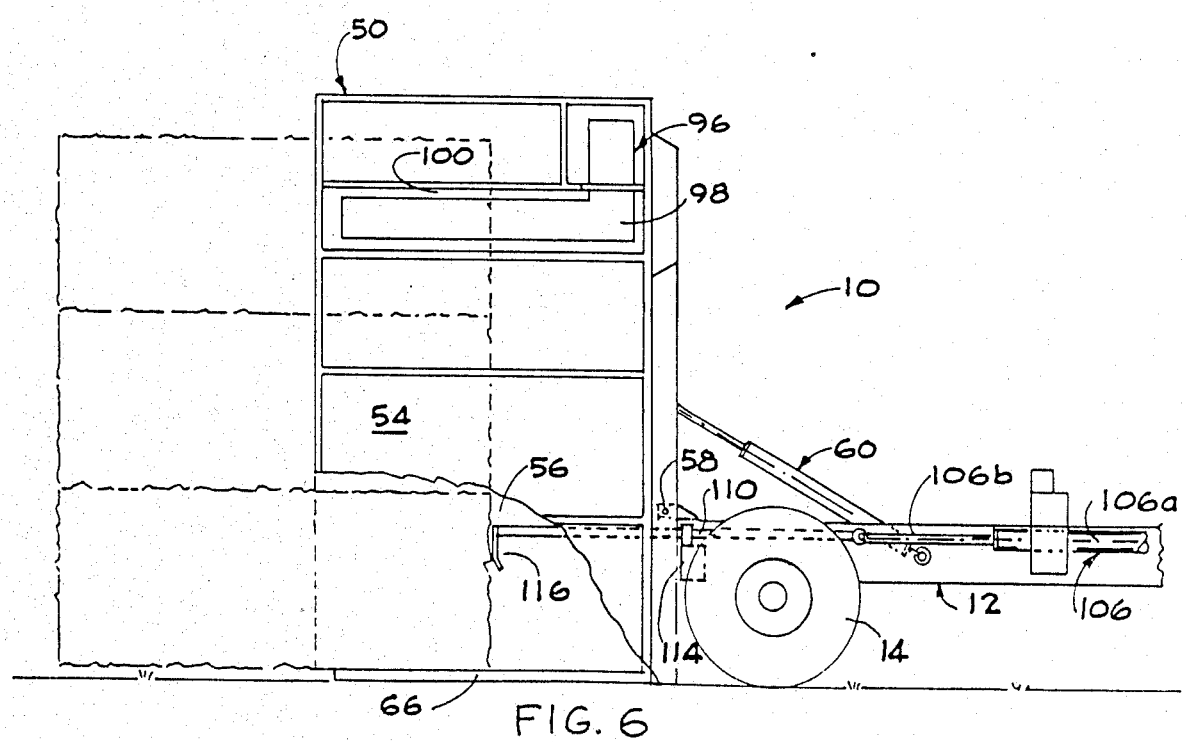
FIG. 6 ered vehicle, of the type used for handling baled hay. More particularly, the vehicle of the instant invention is designed to pick up, load and stack large bales of hay.

SELF-PROPELLED AGRICULTURAL VEHICLE FOR PICKING UP AND TRANSPORTING LARGE BALES OF HAY

BACKGROUND AND SUMMARY OF THE INVENTION

The present invention pertains to agricultural equipment, i.e., a vehicle, of the type used for handling baled hay. More particularly, the vehicle of the instant invention is designed to pick up, load and stack large bales of hay.

Recent developments in the field of agriculture have resulted in a concept of forming hay into bales which have dimensions on the order of 3 feet by 4 feet by 8 feet. These so-called "big bales" are considered a more efficient way of handling cut hay. One big bale is equal to approximately 24 conventional size bales. Big bales produce a more compact, weather-tight stack than do conventional size bales. The big bales also require less twine or baling wire than do a comparable volume of conventional bales.

Handling big bales is not, however, an easy task. Big bales weigh 1,500 to 2,000 pounds, depending on the moisture content of the hay. Conventional bales may be loaded on hay wagons by a conveyor system, generally with a manual assist by a field hand. Conventional bales may be manually stacked in a hay wagon which may or may not incorporate some form of automatic off-loading system. Such is not the case with big bales.

A preferred embodiment of the instant invention includes a self-powered chassis with a conveyor system and a pivoting, load-carrying box. One field hand may, through the use of this vehicle, pick up baled hay in the field, load it onto the vehicl transport the bales of hay to a stacking site, and off-load six to eight bales of hay, comprising up to six tons of hay. The bales are rotated 180° about their transverse axis by the time they are off-loaded, causing the side of the bale which was on the ground in the field to be on the top when the bales are off-loaded. Once big bales are stacked, they are considerably more stable than are conventional size bales, which generally require a criss-cross stacking pattern to provide stability.

A general object of the invention is to provide a vehicle which may be operated by a single person and which will load, order and off-load big bales of hay.

Another object of the instant invention is to provide an agricultural vehicle which will arrange big bales of hay in a compact, weather-tight stack.

A further object of the instant invention is to provide an agricultural vehicle which will arrange big bales of hay in a stable stack.

Various other objects and advantages which are attained by the vehicle of the invention will become more fully apparent as the description which follows is read in conjunction with the accompanying drawings.

BRIEF DESCRIPTION OF THE DRAWINGS

FIG. 4 is a median section through the box, along the line 4—4 in FIG. 2.

FIG. 5 is an enlarged fragmentary side elevation of the vehicle, showing how a bale is picked up and dropped in the box.

FIG. 6 is an enlarged fragmentary side elevation, showing partially off-loaded bales.

DETAILED DESCRIPTION OF A PREFERRED EMBODIMENT OF THE INVENTION

Figure 3:
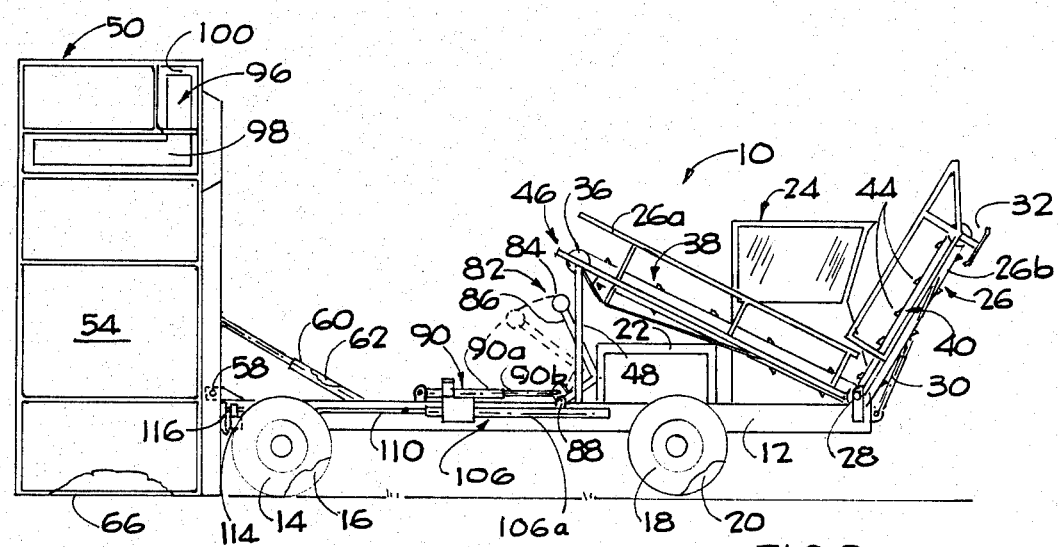
FIG. 3 is a side elevation view of the vehicle with a box in the vehicle in a substantially vertical off-loading position, with portions broken away.
Figure 2:
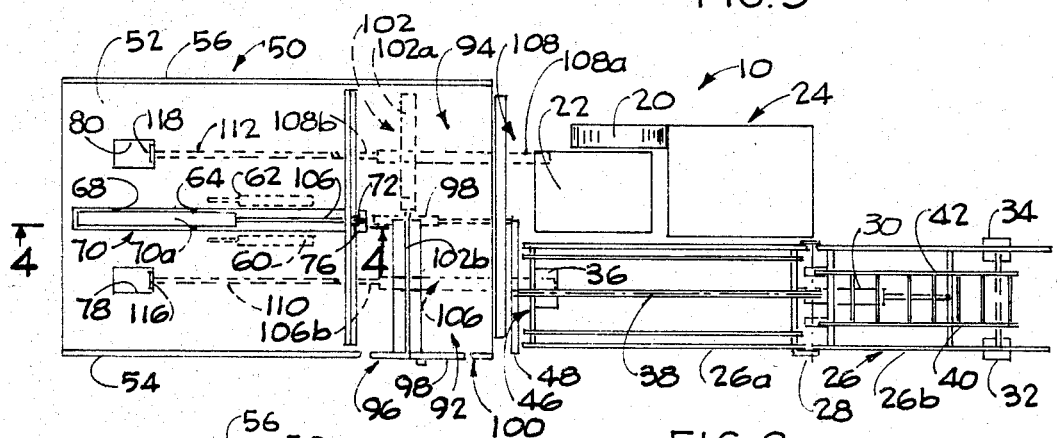
FIG. 2 is a top plan view of the vehicle, with portions broken away.
Figure 1:
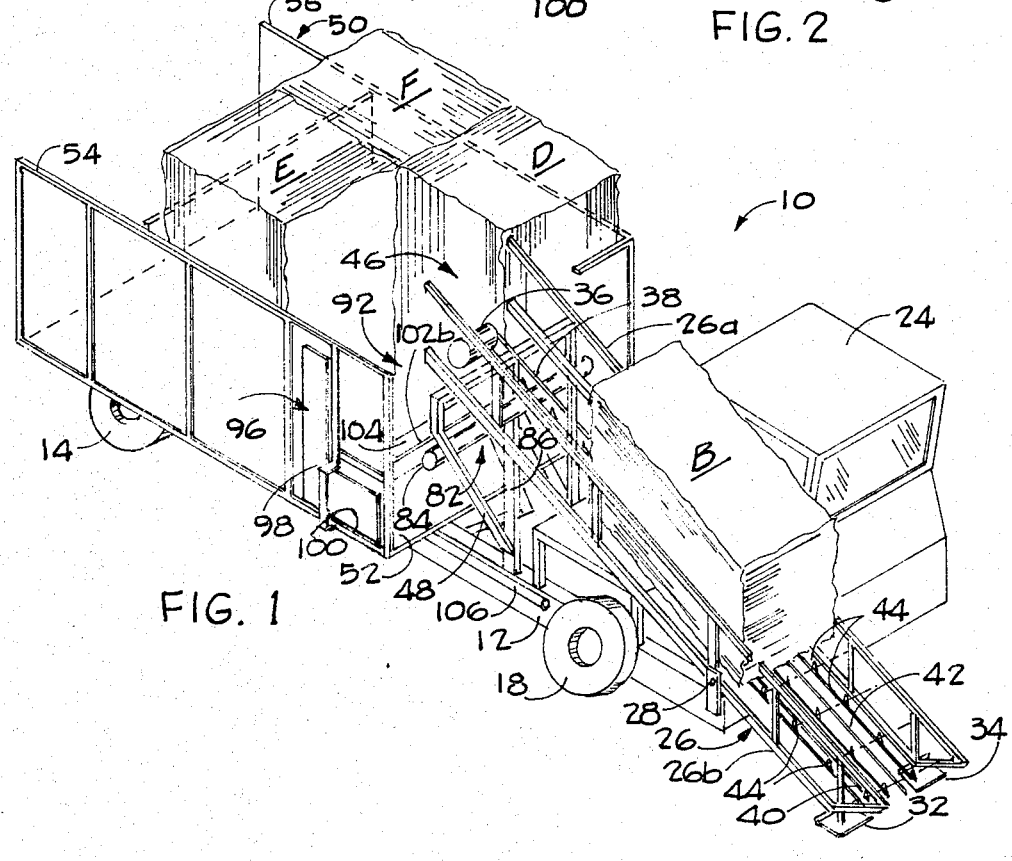
FIG. 1 is an isometric view of the vehicle, showing three loaded bales and a fourth bale on a conveyor in the vehicle.

With the reader's attention directed to FIGS. 1 through 3, a self-propelled, bale-loading agricultural vehicle is shown generally at 10. The vehicle includes a mobile chassis 12, with a pair of rear driving wheels 14, 16 and a pair of front steerable wheels 18, 20. An engine compartment 22 is located adjacent the front wheels. The engine compartment encloses an engine, which provides powered means for moving the chassis and operating a hydraulic pump which provides power for the several hydraulic rams and motors necessary for proper functioning of the vehicle. An operator cab 24 is located on the forward end of chassis 12, ahead of engine compartment 22. Cab 24 provides shelter for the vehicle operator and for the vehicle controls.

Adjacent cab 24 on the forward end of the chassis is a conveyor 26. Conveyor 26 includes a fixed portion 26a which is rigidly attached to the chassis. An articulated portion 26b may be placed in a lowered position, as shown in FIGS. 1 and 2, for picking up bales from the ground, or the articulated portion may be rotated about an articulation point 28 by means of a powered conveyor ram 30, to a raised position when the vehicle is operated on a highway, or at anytime when the vehicle is operated at a speed greater than that which is used for picking up bales out of a field. The articulated portion of the conveyor, when in the lowered position, rests on a pair of skids 32, 34 which slide across the ground.

A hydraulic motor 36 provides power for an upper chain conveyor 38 extending along fixed conveyor portion 26a, and two lower chain conveyors 40, 42 extending along articulated portion 26b. Plural U-shaped dogs, like that shown at 44, are fixed to the chain conveyors for picking up and transporting a bale from a position on the ground to an off-bearing, conveyor discharge location, shown generally at 46. The aft end of conveyor 26 and hydraulic motor 36 are supported by a lattice-type conveyor support assembly 48.

An elongate bale-receiving box, or dump body, shown generally at 50, is mounted on chassis 12 aft of conveyor 26 and engine compartment 22. The longitudinal axis of box 50 parallels the longitudinal axis of chassis 12. Box 50 includes a base 52 and a pair of spaced-apart sides 54, 56. The front and rear of the box are open. Box 50 is pivotably mounted at 58 on chassis 12. A pair of powered ram or motor means 60, 62 are journaled on chassis 12 and box cross member 64, and these are used to pivot the box. Box 12 is pivotable between a substantially horizontal loading position, shown in FIGS. 1 and 2, and a substantially vertical off-loading position, shown in FIG. 3.

Referring now to FIGS. 2 and 4, located within the box is an upright wall 66. Such extends transversely within the interior of the box and is suitably mounted for movement along the length of the box from a forward position, (shown in solid outline in FIGS. 2 and 4) which is substantially the width of a bale rearwardly of the front of the box, to a position directly adjacent the rear of the box (shown in dashed lines in FIG. 4) where it closes such rear end off. Floor or base 52 of the box is provided with an elongate slot 68 extending axially of the vehicle. Mounted on and beneath the floor is a fluid-operated ram 70 with its cylinder end 70a secured in a stationary position adjacent the rear of the box and an extensible rod end 70b extending forwardly of this cylinder end. A cable 72 has one end 72a suitably secured to the box under the box's floor and extends from this end over a pulley 74 journaled to the forward extremity of rod end 70b to a connector 76 which is joined to wall 66. As will hereinafter be described, wall 66 moves rearwardly in the box from the forward position under the action of bales being pushed thereagainst as the box is filled with bales. This being accompanied with contraction of ram 70. The wall is moved forwardly from a position adjacent the rear end of the box by extension of the ram.

A pair of ejector ports 78, 80 is located in base 52 on either side of slot 68 and adjacent the rear of chassis 12.

A pusher means or rear pushing means shown generally at 82 is provided for pushing bales that occupy the forward end of the box rearwardly in the box. The pusher means comprises a horizontal, transversely extending push bar 84, also referred to herein as a powered push element. The push bar is secured to the upper end of a pair of laterally-spaced, upright, L-shaped supports 86 which have lower ends pivotally supported at 88 on the frame of the vehicle. A fluid-operated ram 90 with its cylinder end 90a suitably mounted in a stationary position on the vehicle frame or chassis, has an extendible rod end 90b suitably secured to supports 86. The ram is actuated to move the bar of the pusher means from a forward at-rest position rearwardly as shown by the dashed outline in FIG. 3. Specifically, such movement occurs with contraction of the ram, which results in rearward swinging of supports 86 and bar 84.

A bale, on leaving conveyor 26, becomes deposited within box 50 adjacent the forward end of the box and on the side of the box which is on the right when facing the forward end of the vehicle. This region of the box is referred to herein as the box or body entry zone, and is shown generally at 92. Means is provided for moving a bale occupying the box entry zone whereby such is moved laterally of the vehicle to place such adjacent the left side of the vehicle (referred to herein as a standby zone in a box, shown at 94) and to thus free the box entry zone for the reception of another bale. This lateral pushing means has been given the general reference numeral 96 in the drawings.

Specifically, pushing means 96 comprises an L-shaped upright, lateral push bar 98 which, in the position shown in FIG. 1, occupies substantially the plane of the side of the box. The side of the box is apertured with an L-shaped opening 100 with such opening receiving the push bar with such occupying the position shown in FIG. 1. Lateral push bar 98 is moved from the position shown in solid lines in FIG. 2 to a position substantially midway between the sides of the box (shown in dashed lines) by fluid-operated ram 102. Specifically, such ram 102 has a cylinder end 102a suitably secured in a stationary position under the base of the box. The extensible rod end 102b of the ram extends from the cylinder end to a connection with the L-shaped push bar 98. Floor or base 52 of the box is slotted at 104 to accommodate movement therealong of the means connecting the rod end of the ram with the L-shaped push bar.

Turning now to FIGS. 2, 3 and 6, means for off-loading bales is provided, which includes a pair of fluid-operated ejector rams 106, 108 extending on each side of chassis or frame 12. Each ram has a cylinder 106a, 108a which is stationarily mounted on the vehicle chassis and an extensible rod end 106b, 108b extending rearwardly from the cylinder end of the ram. The rod end of each ram is connected to a push rod 110, 112, respectively, which extends rearwardly from the rod end of the ram and pushes through a push rod guide, as exemplified at 114. A pair of ejector feet, 116, 118 are suitably secured to the rear end of rods 110, 112, respectively. The ejector feet are aligned with box ejector ports 78, 80 when box 50 is in its substantially vertical, off-loading position.

Wall 66 provides a resistance, resisting free movement of bales rearwardly in the box. To this end, hydraulic circuitry is provided for wall ram 70 which accommodates contraction of ram 70 upon a predetermined rearward force being exerted upon the wall. The circuitry also provides a means for supplying fluid under pressure to the ram to produce extension of the ram when it is desired to move the wall from a rearmost position to its forward position.

VEHICLE OPERATIONS

Turning first to FIG. 5, a self-propelled, bale-loading agricultural vehicle 10 is shown in the bale-loading process. The operator drives the vehicle, with articulated conveyor portion 26b in the lowered position, sliding on skids 32, 34, adjacent a bale of hay A in a grounded position, such that dogs 44 on lower chain conveyors 40, 42 contact the end and lower side of bale A. The end of bale A is lifted off the ground and onto the lower chain conveyor. The bale is transported endo on its side up conveyor 26, as shown by bale B (FIG. 1), until it reaches the point indicated by bale C in FIG. 5 at conveyor discharge location 46.

The bale, after leaving location 46, rotates substantially 90° from its grounded position, and drops on its end into box entry zone 92, located adjacent and below conveyor discharge location 46 at the forward end of box 50.

The vehicle operator activates lateral push bar 98 by means of ram 102. The lateral push bar shifts the bale, in box entry zone 92, across the center line of box 50 to standby zone 94. Lateral push bar 98 then returns to its initial position. Box entry zone 92 is thereby cleared, ready to receive a subsequently loaded bale. Zone 92 and zone 94 together comprise a first row location in the forward end of box 50.

When the first row location is filled, the operator activates rearward push bar 88 by means of ram 90. Push bar 84 and wall 66 coact, wall 66 providing resistance for bales which are being pushed rearward from the first row location by means of push bar 84. Wall ram 70 is yieldably resistant to the force exerted by push bar 84 and allows wall 66 to resistibly move rearward, allowing the bales to be tightly packed on end within box 50.

After the first two loaded bales have been moved rearwardly by push bar 84, the push bar returns to its at-rest position forward of box 50. The third bale is then loaded and shifted laterally. (This stage of loading is depicted by bales D, E and F in FIG. 1.) After a fourth bale is loaded, push bar 84 is again activated and shifts all four bales rearwardly against wall 66, which moves further back in box 50. This sequence of loading, or ordering into ranks and files, continues, until box 50 has reached capacity, which in the particular embodiment shown, means the deposit of six bales within the box.

When box 50 is at capacity, wall 66 forms a closure surface at the rear of the box.

When the vehicle is fully loaded, the operator raises articulated conveyor portion 26b to its upright position and drives the vehicle to a stacking site.

Upon reaching the stacking site, the operator pivots box 50 to a substantially vertical, off-loading position. In this position, the rear portion of box 50 comes adjacent the ground. Wall 66 now becomes a support-slide surface for the loaded bales, and is located close to and substantially parallel to the ground.

The bales have now rotated through 180° about a transverse axis from their grounded position. The side of the bale which was on the ground prior to being picked up by the conveyor is now the top surface of the bale.

The bales are now off-loaded as a unitary assembly or mass. With the box in its substantially vertical, off-loading position, the operator activates rams 106, 108 of the ejecting means, which causes the ejector feet to pass through the ejector ports and slide the bales off of wall/slide-surface 66 onto the ground, as depicted in FIG. 6.

Bales may be stacked in a weather-tight configuration at a stacking site by manuevering the vehicle such that each subsequent load is positioned adjacent a prior off-loaded unitary mass of bales. The vehicle is backed to a position which compacts newly arrived bales with those previously off-loaded. The operator activates the ejector rams and simultaneously moves the vehicle forward at a speed equal to that of the rearward movement of the ejector ram arms. Bales are thereby off-loaded in close proximity to previously off-loaded bales, forming a weather-tight stack of bales.

After off-loading, the ejector rams contract and the ejector feet are retracted. Box 50 may then be brought to its substantially horizontal loading position, and the vehicle returned to the field for another load of hay. An interlock mechanism may be provided to prevent box 50 from being returned to its loading position prior to complete retraction of the ejector means.

While a preferred embodiment of the invention has been described, it is appreciated that variations and modifications may be made herein without departing from the spirit of the invention.

It is claimed and desired to secure by Letters Patent:

1. An agricultural vehicle for picking up and transporting bales of hay, which comprises
   a vehicle chassis and means supporting the chassis for movement over the ground,
   a bale-receiving box having forward and rear ends, a floor, spaced apart lateral sides, and an entry zone at said forward end, said box being pivotally mounted on the chassis to permit tilting of the box about a horizontal axis extending transversely of the vehicle axis,
   an upright wall disposed within the box extending transversely of the vehicle axis and mounted for movement in a path extending along such vehicle axis for movement from the forward to the rear end of the box,
   means connected to said wall, resisting free movement of the wall rearwardly in the box along said path,
   conveyor means mounted on the chassis operable to pick up and transport bales to the forward end of the box forward of said wall, said conveyor means being operable to pick up bales lying on the ground and then transport the bales, while on their sides endo therealong, the conveyor means having an off-bearing end adjacent said entry zone which is elevated above the floor of the box whereby a bale rotates over its end substantially 90° on leaving said off-bearing end and falling to the floor of the box to become positioned on its end in said entry zone of the box,
   lateral pushing means for pushing a bale laterally within said box out of said entry zone into a standby zone located laterally of the entry zone within said box, such pushing of a bale freeing said entry zone for another bale, said lateral pushing means having a powered ram affixed under the floor of said box and a lateral push bar operatively connected to said ram for pushing a bale, and
   rear pushing means for pushing bales within the box and in said entry zone and said standby zone rearwardly in the box whereby to free the entry zone and the standby zone to receive other bales, with such bales pushed by said pushing means pushing against said wall and rearward movement of such bales being restrained by the means resisting free movement of the wall.

2. The vehicle of claim 1, wherein said rear pushing means comprises a powered push element mounted for fore-and-aft movement on said vehicle chassis independently of said box, and said lateral push bar is mounted in said box.

3. An agricultural vehicle for picking up and transporting elongate bales of hay, which comprises
   a vehicle chassis and means supporting the chassis for movement over the ground,
   a bale-receiving dump body, having a floor, opposed sides and forward and rear ends, means mounting said body on the chassis, including pivot means permitting tilting of said body about an axis extending transversely of said sides, said rear end lowering to the ground with pivoting of said body, said forward end of said dump body includes an entry zone for a bale and a standby zone for a bale disposed transversely of such vehicle axis from said entry zone, said zones comprising a first row location,
   a conveyor mounted on the chassis at the forward end of the vehicle for picking up and transporting bales with such bales lying on their sides and travelling endo on said conveyor, said conveyor having a discharge end located adjacent the forward end of the dump body and between the sides of said body and elevated above the floor of the dump body a distance at least equaling a major portion of the length of the bale, a bale on discharging from the conveyor, rotating end over end 90° to become positioned on the floor of the dump body and between the sides of the dump body adjacent its forward end, said entry zone being disposed beneath said conveyor discharge end, and,
   means for ordering bales deposited in said dump body into ranks and files which fill the dump body including an upright wall disposed transversely of the dump body and mounted for movement in a path from adjacent the forward end to the rear end of the body, said wall when positioned adjacent the forward end of said body providing a rearward stop for bales as the bales are deposited in said entry zone, said wall being operatively connected to means resisting free movement of the wall rearwardly in said body, said wall providing a rearward rest for bales during the ordering of the bales, lateral pushing means disposed between said sides which shifts a loaded bale from said entry zone to said standby zone, and rear pushing means which shifts a plurality of bales in said first row location rearward to a second row location, against a yieldable resistance provided by said wall.

4. The vehicle of claim 3 wherein said lateral pushing means includes a ram mounted under said floor and on said body whereby said ram pivots with said dump body, said lateral pushing means further including an upstanding, lateral push bar having a retracted position adjacent a side of the body.

* * * * *